(12) United States Patent
Li et al.

(10) Patent No.: US 11,905,584 B2
(45) Date of Patent: Feb. 20, 2024

(54) APPARATUS AND PROCESS FOR LOCALIZED PATTERNED SURFACE HARDENING FOR LIGHT-WEIGHT ALLOYS TO INCREASE WEAR RESISTANCE UNDER LUBRICATED CONTACT

(71) Applicant: GM GLOBAL TECHNOLOGY OPERATIONS LLC, Detroit, MI (US)

(72) Inventors: Zhe Li, Rochester, MI (US); Yucong Wang, West Bloomfield, MI (US); Qigui Wang, Rochester Hills, MI (US); Wenying Yang, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 877 days.

(21) Appl. No.: 16/737,444

(22) Filed: Jan. 8, 2020

(65) Prior Publication Data
US 2021/0207253 A1    Jul. 8, 2021

(51) Int. Cl.
*C22F 1/047* (2006.01)
*C22C 21/08* (2006.01)
*B21D 37/01* (2006.01)
*B21D 37/18* (2006.01)
(Continued)

(52) U.S. Cl.
CPC ............. *C22F 1/047* (2013.01); *B21D 37/01* (2013.01); *B21D 37/16* (2013.01); *B21D 37/18* (2013.01); *C22C 21/08* (2013.01); *F16C 3/00* (2013.01)

(58) Field of Classification Search
CPC . C22F 1/047; C22F 3/00; B21D 37/01; B21D 37/16; B21D 37/18; C22C 21/08; F16C 3/00; F16C 17/02; F16C 17/04; F16C 17/10; F16C 19/04; F16C 19/10; F16C 19/14; F16C 33/121; F16C 33/14; F16C 33/24; F16C 33/585; F16C 33/62; F16C 33/64; B32B 15/01; B32B 15/017; C21D 1/06; C21D 9/40; C21D 2221/00; C21D 6/008; C21D 10/005; B23P 9/00; C23C 24/103

See application file for complete search history.

(56) References Cited

U.S. PATENT DOCUMENTS 2,268,869 A * 1/1942 Given ................. F16C 33/24
                                                              384/283
3,235,316 A * 2/1966 Whanger ............ F16C 33/24
                                                              384/95
(Continued)

FOREIGN PATENT DOCUMENTS

CN    205605650 U  *  9/2016
CN    107906235 A  *  4/2018

*Primary Examiner* — Kurt Philip Liethen
(74) *Attorney, Agent, or Firm* — Quinn IP Law

(57) ABSTRACT

An apparatus for localized patterned surface hardening for light-weight alloys to increase wear resistance under lubricated contact is provided. The apparatus includes a first metallic structure and a second metallic structure. The second metallic structure includes a contact surface and is disposed in lubricated contact with the first metallic structure at the contact surface, wherein the second metallic structure is constructed with a lighter-than-steel material and wherein the contact surface includes a localized surface hardened pattern.

16 Claims, 7 Drawing Sheets

(51) Int. Cl.
*B21D 37/16* (2006.01)
*F16C 3/00* (2006.01)

(56) References Cited

U.S. PATENT DOCUMENTS

| | | | | |
|---|---|---|---|---|
| 5,072,092 A * | 12/1991 | Richter | ............... | B23K 26/60 |
| | | | | 219/121.72 |
| 2002/0034454 A1* | 3/2002 | Fujita | ............... | F16C 33/121 |
| | | | | 420/548 |
| 2002/0072421 A1* | 6/2002 | Ouchi | ............... | B60B 27/0084 |
| | | | | 464/178 |
| 2006/0090591 A1* | 5/2006 | Graeve | ............... | F16H 57/032 |
| | | | | 74/607 |
| 2006/0257059 A1* | 11/2006 | Kubota | ............... | F16C 33/24 |
| | | | | 384/293 |
| 2006/0288579 A1* | 12/2006 | Luo | ............... | F16C 33/103 |
| | | | | 29/527.1 |
| 2010/0150489 A1* | 6/2010 | Maeda | ............... | C21D 9/40 |
| | | | | 148/319 |
| 2015/0233423 A1* | 8/2015 | Peterson | ............... | F16C 43/02 |
| | | | | 384/420 |
| 2016/0177959 A1* | 6/2016 | Marya | ............... | C10M 103/04 |
| | | | | 415/177 |
| 2017/0298990 A1* | 10/2017 | Lozier | ............... | F16C 33/64 |

\* cited by examiner

APPARATUS AND PROCESS FOR LOCALIZED PATTERNED SURFACE HARDENING FOR LIGHT-WEIGHT ALLOYS TO INCREASE WEAR RESISTANCE UNDER LUBRICATED CONTACT

INTRODUCTION

The disclosure generally relates to an apparatus and process for localized patterned surface hardening for light-weight alloys to increase wear resistance under lubricated contact.

Localized surface hardening is a process whereby a portion of a metallic object is subjected to a process to make that portion harder than a rest of the metallic object. Ferrous materials may be surface hardened by locally applying heat to the portion of the metallic object, bringing the portion close to or to the melting point of the material, and subsequently rapidly cooling the portion, the process taking advantage of the different resulting properties of iron and steel alloys depending upon the conditions under which the iron and steel alloys are formed.

According to one process, by creating a molten portion of an aluminum or magnesium object, new material may be added and melted, with the molten aluminum or magnesium mixing with the molten new material to form a localized distinct alloy from the rest of the object. This localized distinct alloy may be formulated or selected to be harder than a rest of the object.

SUMMARY

An apparatus for localized patterned surface hardening for light-weight alloys to increase wear resistance under lubricated contact is provided. The apparatus includes a first metallic structure and a second metallic structure. The second metallic structure includes a contact surface and is disposed in lubricated contact with the first metallic structure at the contact surface, wherein the second metallic structure is constructed with a lighter-than-steel material and wherein the contact surface includes a localized surface hardened pattern.

In some embodiments, the localized surface hardened pattern includes a series of surface hardened portions, each surface hardened portion being separated from a remainder of the surface hardened portions by portions of the second metallic structure.

In some embodiments, each of the surface hardened portions includes parallel boundaries.

In some embodiments, each of the surface hardened portions is constructed of an alloy including the lighter-than-steel material and an added material.

In some embodiments, the added material includes nickel, boron, chromium, silicone, or carbon.

In some embodiments, the added material is provided as a high entropy alloy phase.

In some embodiments, the high entropy alloy phase is micro-alloyed with boron, carbon, or silicone.

In some embodiments, each of the surface hardened portions includes hard intermetallic particles.

In some embodiments, each of the surface hardened portions includes a ceramic material, and each of the surface hardened portions is a metallic matrix composite.

In some embodiments, the localized surface hardened pattern includes one of a discontinuous parallel pattern, a discontinuous non-parallel pattern, a regularly curved pattern, and an irregularly curved pattern.

In some embodiments, the lighter-than-steel material includes aluminum.

In some embodiments, the lighter-than-steel material includes magnesium.

In some embodiments, the second metallic structure is disposed in lubricated contact with the first metallic structure at the contact surface.

In some embodiments, the localized surface hardened pattern includes an annular surface hardened portion parallel with a direction of wear for the contact surface.

According to one alternative embodiment, an apparatus for localized patterned surface hardening for light-weight alloys to increase wear resistance under lubricated contact is provided. The apparatus includes a first metallic structure including a steel ball bearing device and a second metallic structure including a transmission case housing. The second metallic structure further includes a contact surface and is disposed in contact with the first metallic structure at the contact surface, wherein the contact surface includes a localized surface hardened pattern. The apparatus further includes a transmission shaft inserted within the steel ball bearing device. The transmission case housing is constructed of one of aluminum or magnesium.

In some embodiments, the localized surface hardened pattern includes a series of surface hardened portions, each surface hardened portion being separated from a remainder of the surface hardened portions by portions of the second metallic structure.

In some embodiments, each of the surface hardened portions is constructed of an alloy including an added material.

According to one alternative embodiment a process for localized patterned surface hardening for light-weight alloys to increase wear resistance under lubricated contact is provided. The process includes identifying a contact surface subject to wear upon a metallic structure constructed with a lighter-than-steel material and creating upon the contact surface a localized surface hardened pattern.

In some embodiments, creating upon the contact surface the localized surface hardened pattern includes creating a melted portion of the metallic structure and mixing with the melted portion an added material.

In some embodiments, creating upon the contact surface the localized surface hardened pattern includes utilizing a laser alloying process to create surface hardened portions upon the contact surface.

In some embodiments, creating upon the contact surface the localized surface hardened pattern includes utilizing one of friction-stir welding and high strain rate solid deformation.

The above features and advantages and other features and advantages of the present disclosure are readily apparent from the following detailed description of the best modes for carrying out the disclosure when taken in connection with the accompanying drawings.

DETAILED DESCRIPTION

Light-weight materials may be used in place of steel to reduce weight in a system. For example, in motorized vehicles, aluminum or magnesium may be used in place of steel to reduce weight in the vehicle with one goal of higher fuel efficiency in the vehicles being achievable. While the overall shape of an object may be optimized for aluminum or magnesium, for example, with reinforcement ribs being used to maintain a threshold overall strength or stiffness in the part, the localized hardness of the material remains a material specific property. A specific alloy of aluminum has a specific hardness. A specific alloy of magnesium has a specific hardness. In high wear conditions, for example, when a harder object such as a steel case of a ball bearing is assembled against a surface of the softer aluminum or magnesium object and subjected to vibration or cyclical stress, the harder object may wear upon the softer object, slowly wearing away material and reducing the serviceable life span of the softer object. Particularly in the automotive applications, the contact surfaces of the bearing steel case with non-ferrous materials such as aluminum or magnesium often get in touch with oil. The oil reduces surface friction coefficient leading to relative movement between the steel case of the ball bearing and soft aluminum or magnesium. Therefore, these contact surfaces are often subject to lubricated wear or increased wear as compared to a similar non-lubricated configuration, due to increased relative movement of the parts.

Localized patterned surface hardening may be utilized to improve wear resistance in light-weight materials such as aluminum and magnesium. In the wear with lubrication, it is ideal to have at least one material with a mixture of soft matrix and hard particles. The softer material may wear away with use, with recessed or pitted surfaces helping to provide stores or pockets of lubricant. With the presence of lubrication, the friction coefficient and thus wear can be dramatically reduced.

An amount and distribution of the hard particles/texture may significantly affect the wear life. In one embodiment, computational tribology may be utilized to determine an optimal surface hardening pattern, for example, optimizing hard particle/texture patterns to minimize the overall friction coefficient and wear.

Light-weight materials described herein may be lighter-than-steel per unit volume and may be softer than steel.

Figure 1:
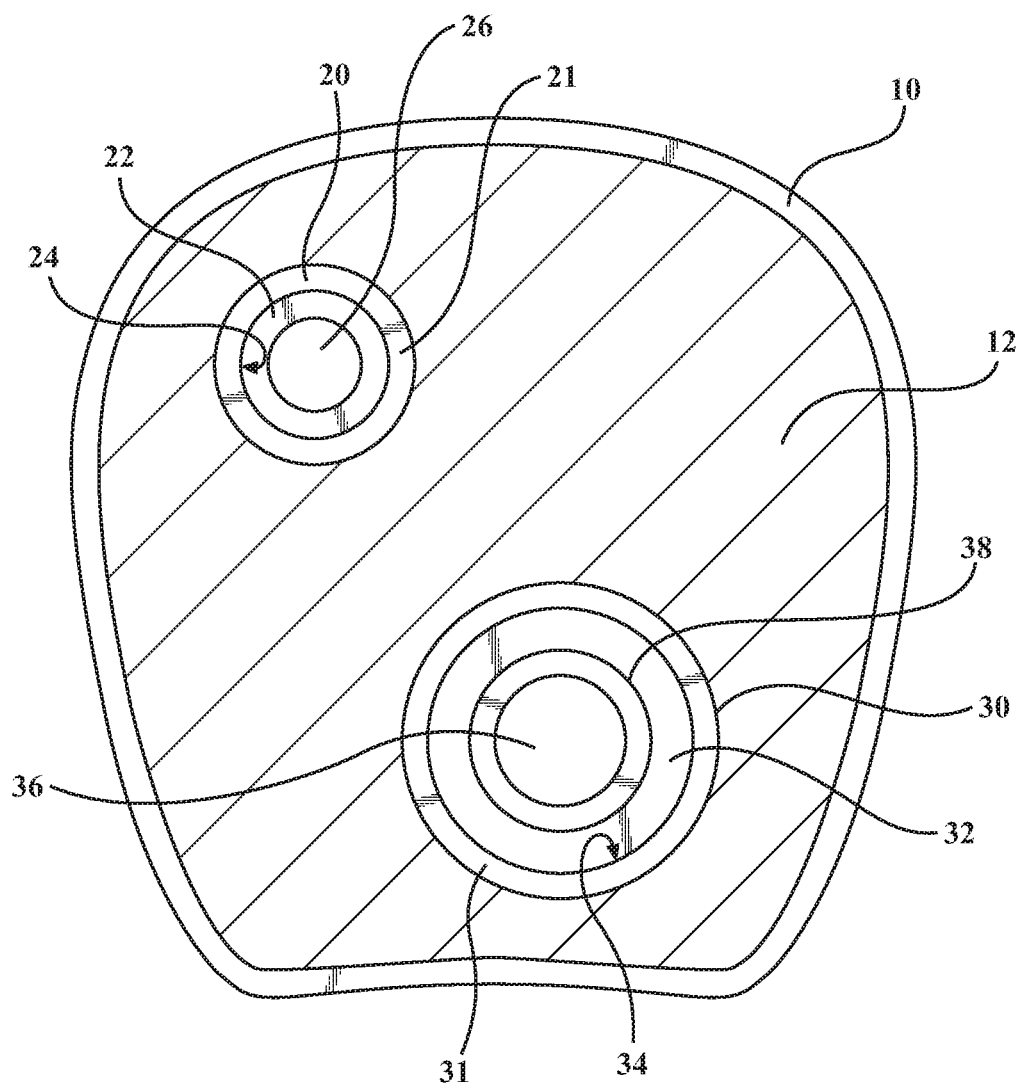
FIG. 1 schematically illustrates an exemplary metallic structure constructed with a lighter-than-steel material such as an aluminum alloy or magnesium alloy, the metallic structure including a first bearing cavity and a second bearing cavity, in accordance with the present disclosure.

Referring now to the drawings, wherein like reference numbers refer to like features throughout the several views, FIG. 1 schematically illustrates an exemplary metallic structure 10 constructed with a lighter-than-steel material such as an aluminum alloy or magnesium alloy including a first bearing cavity 22 and a second bearing cavity 32. In one exemplary embodiment, the metallic structure 10 may be a transmission metallic structure configured to partially encase a vehicular automatic transmission and includes metallic walls 12. Bearing cavity structure 20 is illustrated including annular wall 21, the first bearing cavity 22 including a bearing outer race wall 24, and a shaft cavity 26.

Bearing cavity structure 30 is illustrated including an outer annular wall 31, the second bearing cavity 32 including bearing an outer race wall 34, an inner annular wall 38, and a shaft cavity 36. Each of the first bearing cavity 22 and the second bearing cavity 32 are operable to receive and hold in place another metallic structure, namely, a ball bearing device. Ball bearing devices include an inner race, a cylindrical outer race, and a plurality of ball bearings in between the inner race and the cylindrical outer race operable to facilitate low friction spinning of the inner race relative to the outer race.

Each of the bearing outer race wall 24 and the bearing outer race wall 34 are contact surfaces for the metallic structure 10, wherein persistent, repeated high wear contact is created upon the contact surfaces through interaction with ball bearing devices nested thereto, respectively.

The first bearing cavity 22 includes bearing the outer race wall 24 operable to abut a cylindrical outer race of a ball bearing device. Cylindrical outer races may be made of steel which is harder than non-ferrous materials such as aluminum alloys and magnesium alloys. As the ball bearing device operates, vibration and/or cyclical stresses cause the cylindrical outer race to wear against the bearing outer race wall 24. Harder materials wearing against softer materials cause the softer materials to wear away relatively quickly. The bearing outer race wall 24 may be locally hardened through localized patterned surface hardening to reduce the effects of wear upon the bearing outer race wall 24, thereby increasing a useful lifespan of the metallic structure 10. Similarly, the second bearing cavity 32 includes the bearing outer race wall 34 which may be similarly locally hardened through localized patterned surface hardening to reduce the effects of wear upon the bearing outer race wall 34.

Figure 2:
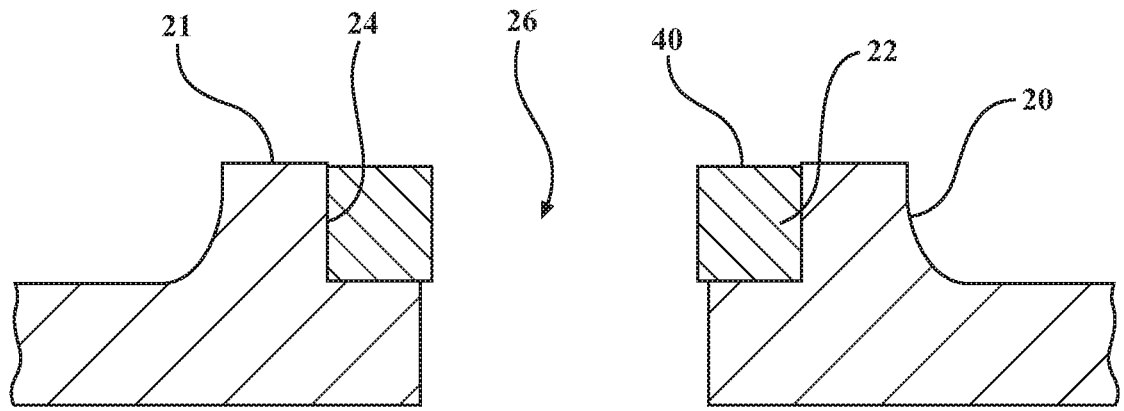
FIG. 2 schematically illustrates a first of the bearing cavity structures of FIG. 1 in cross-sectional view, in accordance with the present disclosure.
Figure 12:
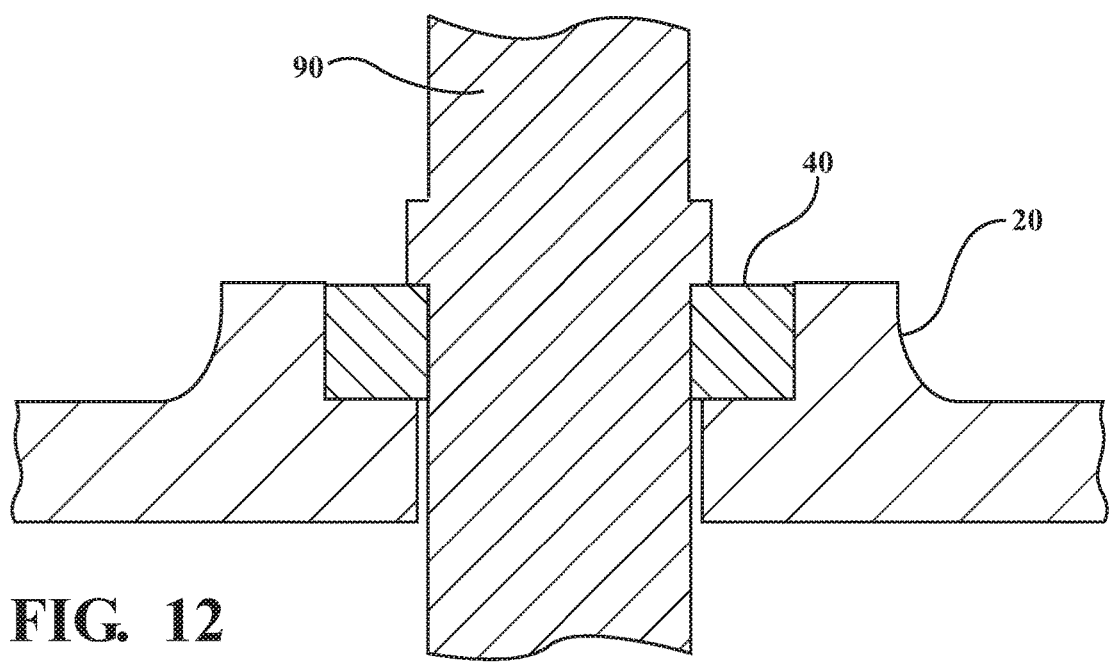
FIG. 12 schematically illustrates the bearing cavity structure of FIG. 2 in cross-sectional view, with the ball bearing device illustrated with a transmission shaft inserted therewithin, in accordance with the present disclosure.

FIG. 2 schematically illustrates the bearing cavity structure 20 in cross-sectional view. The bearing cavity structure 20 is illustrated including the annular wall 21, the first bearing cavity 22 including the bearing outer race wall 24, and the shaft cavity 26. A ball bearing device 40 is illustrated assembled within the first bearing cavity 22. A cylindrical shaft may be inserted within the shaft cavity 26 and attached to an inner race of the ball bearing device 40. FIG. 12 schematically illustrates the bearing cavity structure 20 of FIG. 2 in cross-sectional view, with the ball bearing device 40 illustrated with transmission shaft 90 inserted there within.

Figure 3:
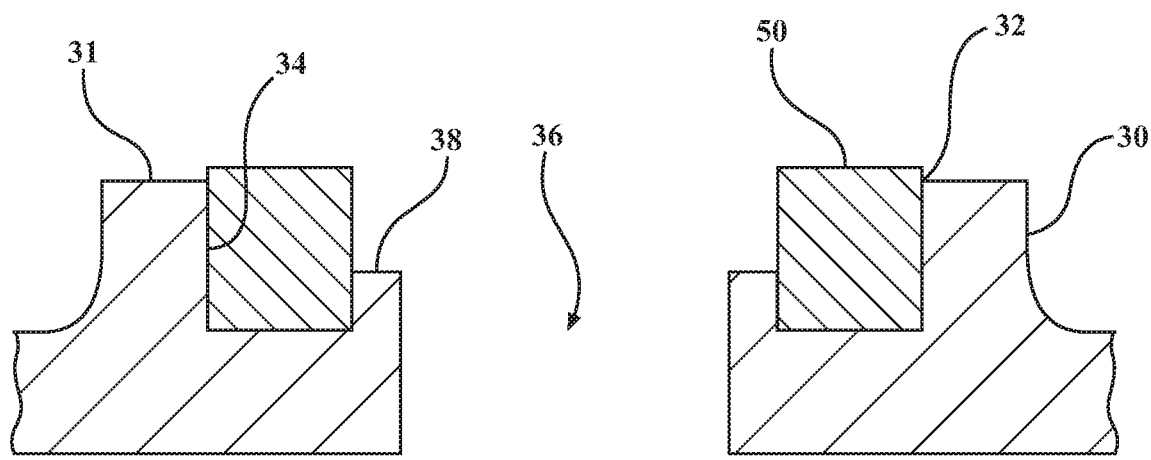
FIG. 3 schematically illustrates a second of the bearing cavity structures of FIG. 1 in cross-sectional view, in accordance with the present disclosure.

FIG. 3 schematically illustrates the bearing cavity structure 30 in cross-sectional view. The bearing cavity structure 30 is illustrated including the outer annular wall 31, the second bearing cavity 32 including the bearing outer race wall 34, the inner annular wall 38, and the shaft cavity 36. A ball bearing device 50 is illustrated assembled with some interference fit within the second bearing cavity 32. A cylindrical shaft may be placed within the shaft cavity 36. The shaft may include a widened portion attached to an inner race of the ball bearing device 50.

Figure 4:
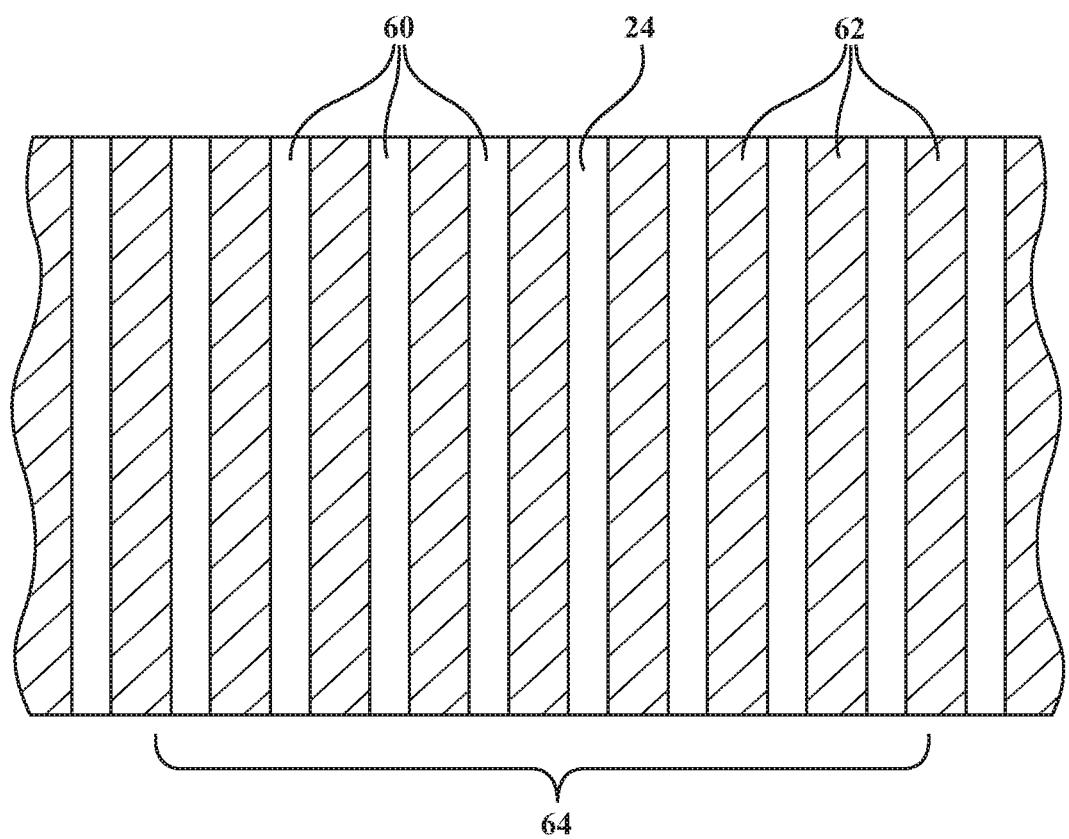
FIG. 4 schematically illustrates a localized surface hardening pattern that may be utilized to improve wear resistance within a bearing cavity, in accordance with the present disclosure.

FIG. 4 schematically illustrates a localized surface hardening pattern 64 that may be utilized to improve wear resistance within a bearing cavity. The bearing outer race wall 24 of FIG. 1 is illustrated in a linear plan view, with a curved inner diameter of the bearing outer race wall 24 illustrated as a flattened partial span, showing surface hardened portions 62 spaced along the bearing outer race wall 24. The linear plan view represents the surface hardened portions 62 that are produced/disposed in an annular pattern on the bearing outer race wall 24 and are parallel to a longitudinal axis of shaft that would be placed within the shaft cavity 26. Portions 60 of the metallic structure 10 of FIG. 1 are visible between the surface hardened portions 62. The portions 60 and the surface hardened portions 62 are illustrated alternatingly repeating and forming the localized surface hardening pattern 64. The localized surface hardening pattern 64 is localized to a portion of the overall metallic structure.

A formation process for the surface hardened portions 62 may include different processes in the art. In one embodiment, a laser is used to heat and/or melt material of the metallic structure 10 in the areas where surface hardened portions 62 are to be formed. Simultaneously or contemporaneously, a powder feed operation may introduce a powder feed, introducing materials to be added or mixed with the material of the metallic structure 10. Materials that may be added through a powder feed may include alloying elements such as nickel (Ni), boron (B), chromium (Cr), silicone (Si), carbon (C), etc. The added elements may form hard intermetallic particles or high entropy alloy (HEA) phases. The high entropy alloy phases can be further micro-alloyed with B, C or Si to produce outstanding hardness (Vickers hardness between 500-800). In some instances, metallic material added may thoroughly mix with the melted material of the metallic structure 10, such that an alloy is created. Such an operation may be described as laser alloying. Alternative processes in the art may similarly be utilized to melt material of metallic structure 10 and mix added materials to the melted material. Another alternative process is to add ceramic materials such as alumina or SiC to form metallic matrix composites (MMC).

Figure 5:
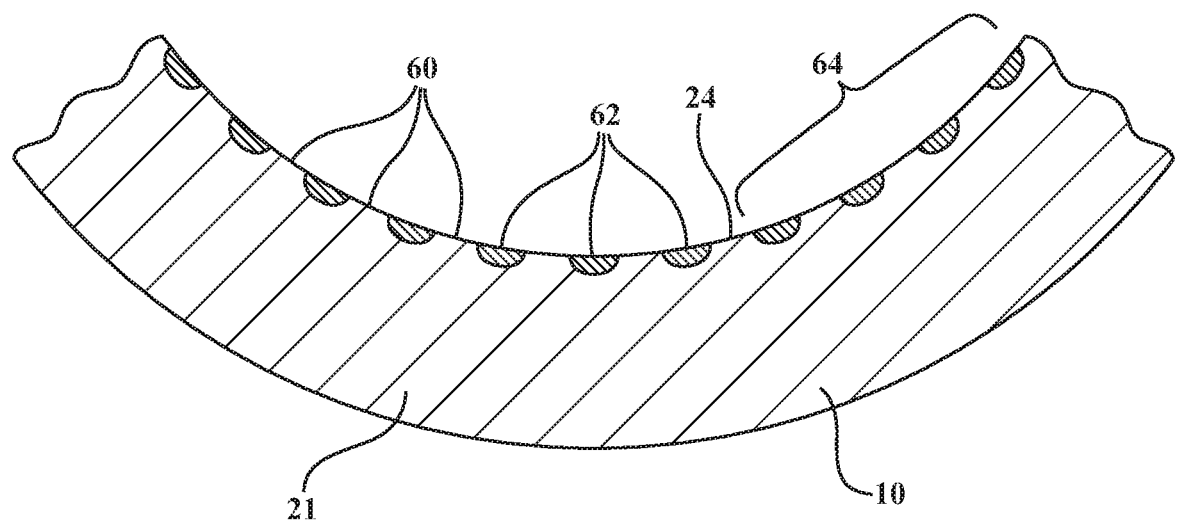
FIG. 5 schematically illustrates in cross-sectional view of the localized surface hardening pattern of FIG. 4, in accordance with the present disclosure.

FIG. 5 schematically illustrates in cross-sectional view the localized surface hardening pattern 64 of FIG. 4. The annular wall 21 of the metallic structure 10 is illustrated including the bearing outer race wall 24. The localized surface hardening pattern 64 is illustrated including alternating instances of the surface hardened portions 62 and the portions 60 of the metallic structure 10.

The surface hardened portions 62 are illustrated in FIGS. 4 and 5. Actual dimensions of the surface hardened portions 62 may vary. In one embodiment, each surface hardened portion 62 may be between 0.5 and 2 millimeters wide. In another embodiment, each portion 60 between the surface hardened portions 62 may be between 0.5 and 2.0 millimeters wide. In another embodiment, each portion of surface hardening may be between 0.015 and 1.000 millimeters deep. In alternative embodiments, portions described may be wider or thinner than the ranges provided herein and may be deeper or less deep than the ranges provided herein.

The portion 60 of the metallic structure 10 includes the light-weight material without surface hardening. The surface hardened portion 62 includes material with increased hardness as compared to the portion 60. In some embodiments, the hardened material of the surface hardened portion 62 may be less flexible or less elastic than the portion 60. Providing alternating segments of the portion 60 and the surface hardened portion 62 may provide increased hardness as compared to a surface constructed with just the material of the portion 60 and may additionally provide increased elasticity as compared to a surface constructed with just the material of the surface hardened portion 62. In the presence of lubricant, the wear resistance is generally improved due to the reduction of friction coefficient from lubrication. In order to retain the lubrication, at least one material of the friction/wear pair may have pits or cavities to store/retain the lubricant.

Figure 6:
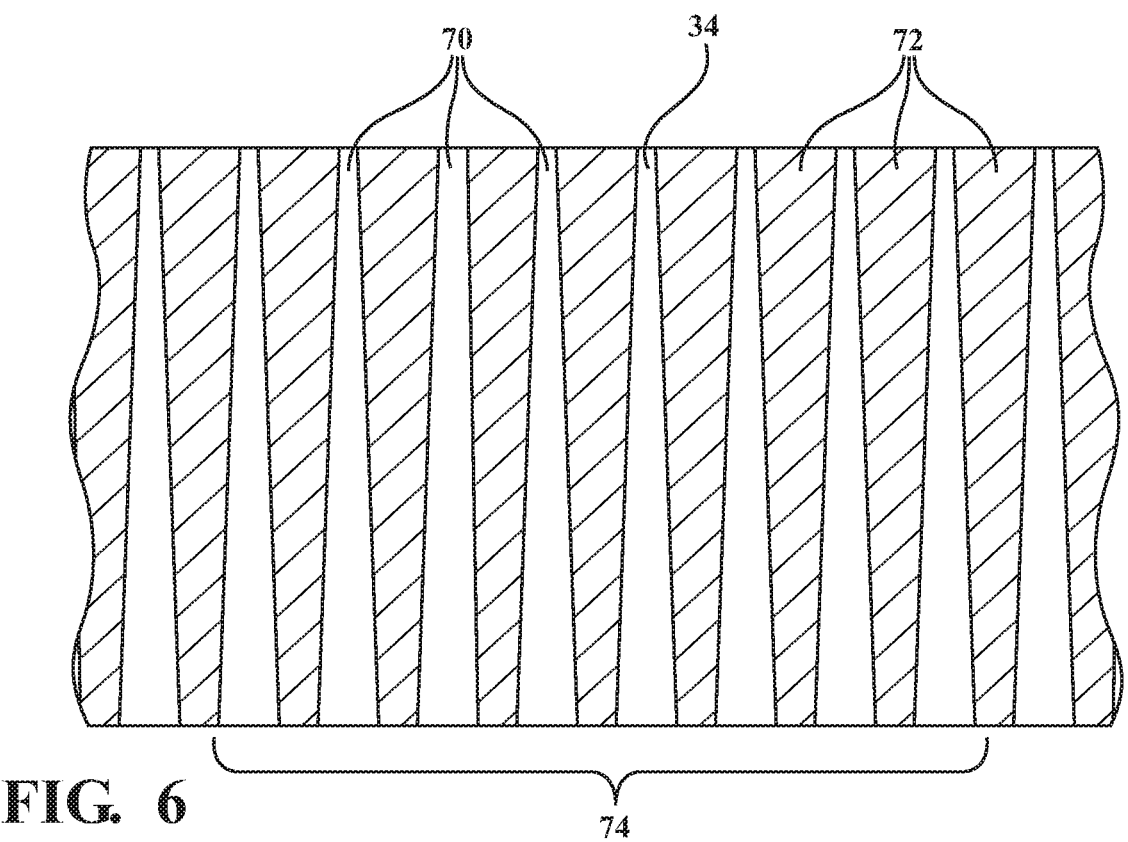
FIG. 6 schematically illustrates an alternative localized surface hardening pattern that may be utilized to improve wear resistance within a bearing cavity, in accordance with the present disclosure.

FIG. 6 schematically illustrates a localized surface hardening pattern 74 that may be utilized to improve wear resistance within a bearing cavity. The bearing outer race wall 34 of FIG. 1 is illustrated in a linear plan view, with a curved inner diameter of the bearing outer race wall 34 illustrated as a flattened partial span, showing the surface hardened portions 72 spaced along the bearing outer race wall 34. The portions 70 of the metallic structure includes the light-weight material without surface hardening. Whereas the surface hardened portion 62 of FIG. 4 are illustrated as parallel rectangular sections with constant widths and constant spacings between the surface hardened portions 62, the surface hardened portions 72 are illustrated with non-parallel boundaries, and the spacings between the surface hardened portions 72 have varying widths. The angularity and variance of widths and spacings may vary, and in some embodiments, the widths and spacings of the surface hardened portions 72 may vary slightly, for example, with boundary lines being one to five degrees away from being parallel.

Figure 7:
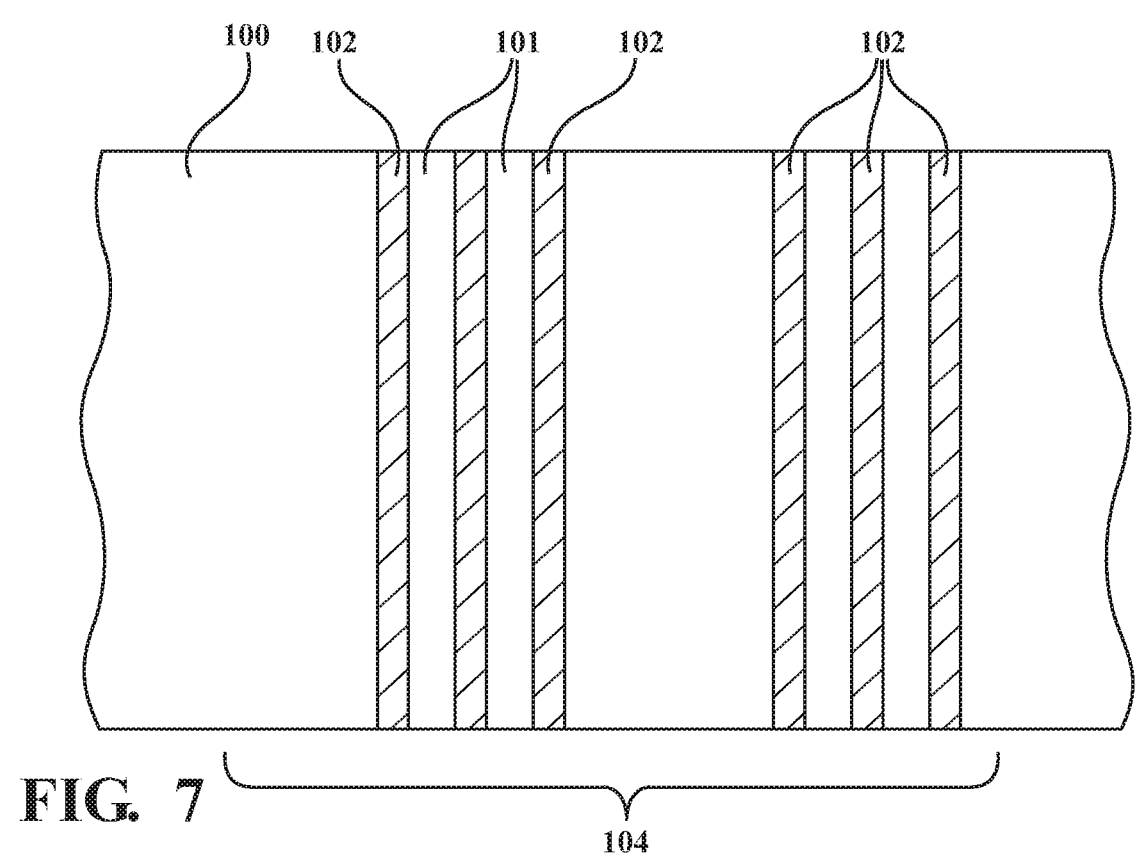
FIG. 7 schematically illustrates a localized surface hardening pattern, embodied as a discontinuous parallel pattern, that may be utilized to improve wear resistance within a bearing cavity, in accordance with the present disclosure.

FIG. 7 schematically illustrates a localized surface hardening pattern 104, embodied as a discontinuous parallel pattern, that may be utilized to improve wear resistance within a bearing cavity. A bearing outer race wall 100 is illustrated in a linear plan view, with a curved inner diameter of the bearing outer race wall 100 illustrated as a flattened partial span, showing the surface hardened portions 102 spaced along the bearing outer race wall 100, with the portions 101 of the material of the bearing outer race wall 100 illustrated separating the surface hardened portions 102. The surface hardened portions 102 are illustrated arranged in a parallel pattern, and the pattern is discontinuous in that groups of the surface hardened portions 102 are separated by relatively larger portions of the material of the bearing outer race wall 100. Other patterns exhibiting discontinuity are envisioned, thus the disclosure is not intended to be limited to the example provided herein.

Figure 8:
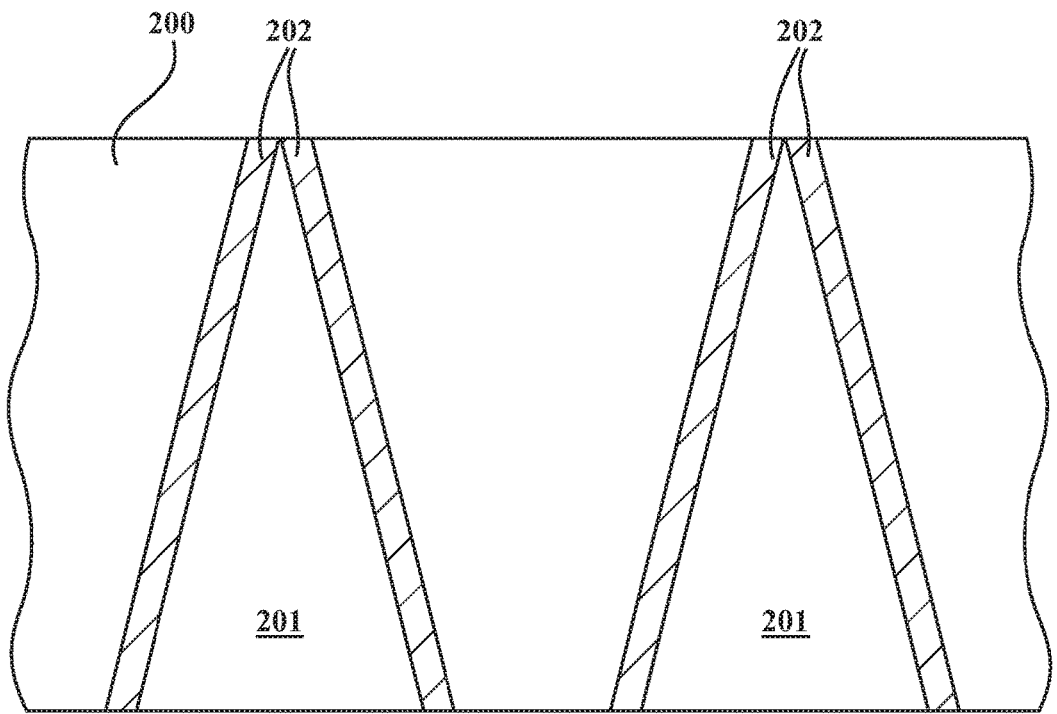
FIG. 8 schematically illustrates a localized surface hardening pattern, embodied as a discontinuous non-parallel pattern, that may be utilized to improve wear resistance within a bearing cavity, in accordance with the present disclosure.

FIG. 8 schematically illustrates a localized surface hardening pattern 204, embodied as a discontinuous non-parallel pattern, that may be utilized to improve wear resistance within a bearing cavity. A bearing outer race wall 200 is illustrated in a linear plan view, with a curved inner diameter of the bearing outer race wall 200 illustrated as a flattened partial span, showing the surface hardened portions 202 spaced along the bearing outer race wall 200, with the portions 201 of the material of the bearing outer race wall 200 illustrated separating the surface hardened portions 202. The surface hardened portions 202 are illustrated arranged in a non-parallel pattern, and the pattern is discontinuous in that groups of the surface hardened portions 202 are separated by relatively larger portions of the material of the bearing outer race wall 200. Other patterns exhibiting discontinuity are envisioned, thus the disclosure is not intended to be limited to the example provided herein.

Figure 9:
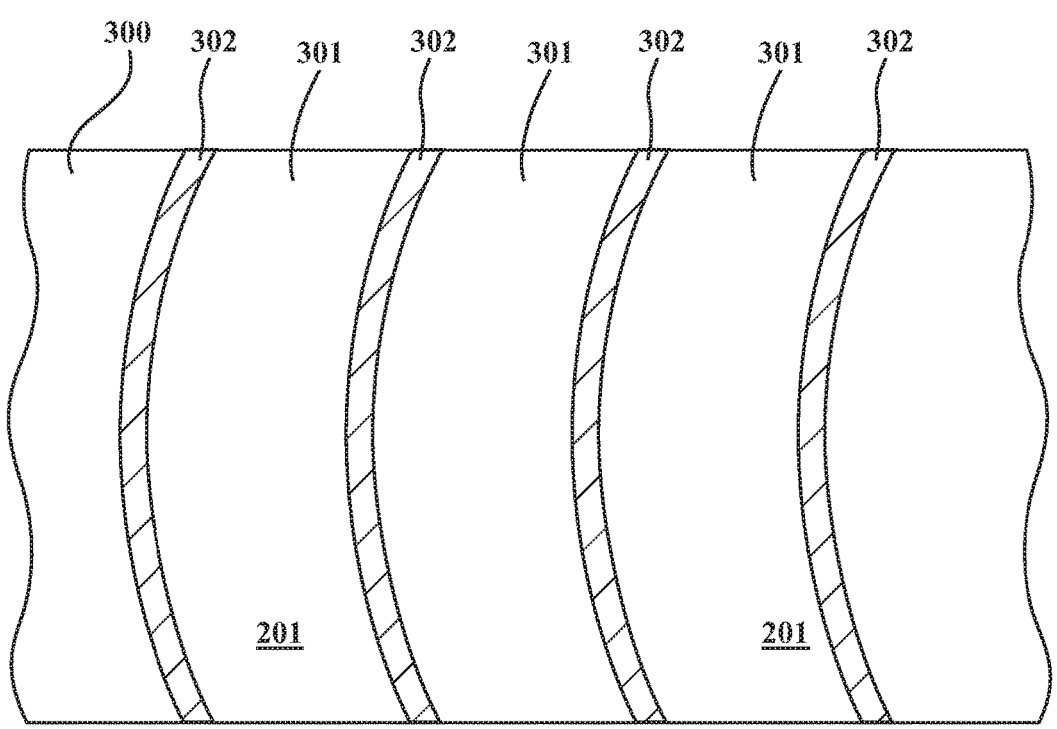
FIG. 9 schematically illustrates a localized surface hardening pattern, embodied as a regularly curved pattern, that may be utilized to improve wear resistance within a bearing cavity, in accordance with the present disclosure.

FIG. 9 schematically illustrates a localized surface hardening pattern 304, embodied as a regularly curved pattern, that may be utilized to improve wear resistance within a bearing cavity. A bearing outer race wall 300 is illustrated in a linear plan view, with a curved inner diameter of the bearing outer race wall 300 illustrated as a flattened partial span, showing the surface hardened portions 302 spaced along the bearing outer race wall 300, with the portions 301 of the material of the bearing outer race wall 300 illustrated separating the surface hardened portions 302. The surface hardened portions 302 are illustrated, each including a regular, repeating curved shape. Other patterns of regularly curved surface hardened portions are envisioned, thus the disclosure is not intended to be limited to the example provided herein.

Figure 10:
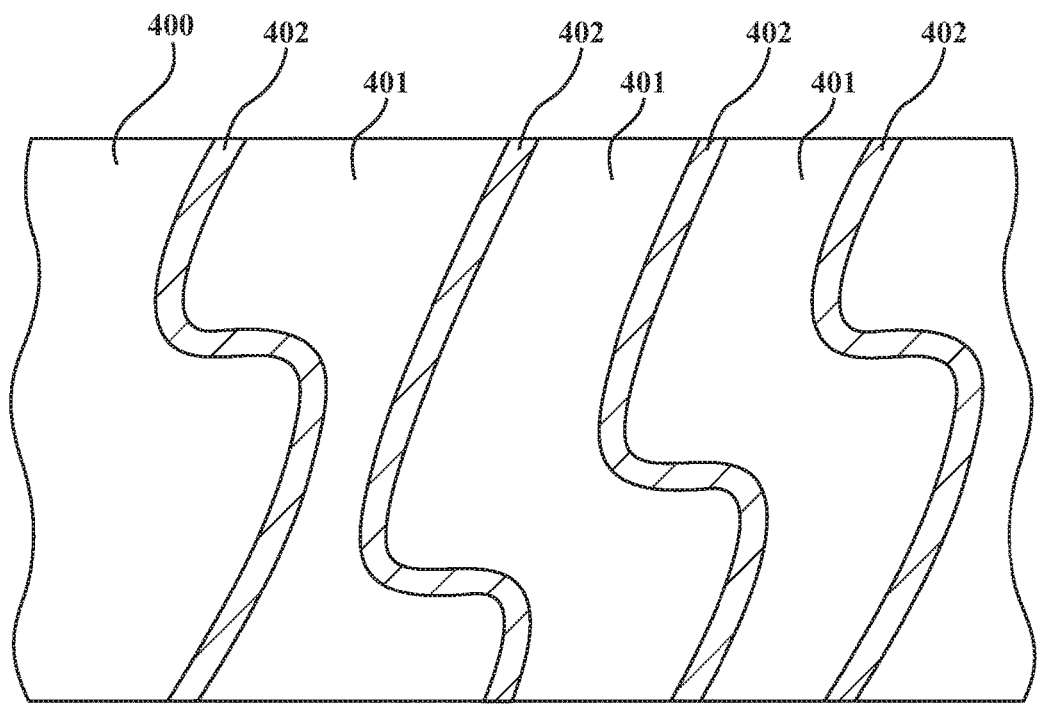
FIG. 10 schematically illustrates a localized surface hardening pattern, embodied as an irregularly curved pattern, that may be utilized to improve wear resistance within a bearing cavity, in accordance with the present disclosure.

FIG. 10 schematically illustrates a localized surface hardening pattern 404, embodied as an irregularly curved pattern, that may be utilized to improve wear resistance within a bearing cavity. A bearing outer race wall 400 is illustrated in a linear plan view, with a curved inner diameter of the bearing outer race wall 400 illustrated as a flattened partial span, showing the surface hardened portions 402 spaced along the bearing outer race wall 400, with the portions 401 of the material of the bearing outer race wall 400 illustrated separating the surface hardened portions 402. The surface hardened portions 402 are illustrated, each including an irregular, non-sequentially-repeating curved shape. Other patterns of irregularly curved surface hardened portions are envisioned, thus the disclosure is not intended to be limited to the example provided herein.

Figure 11:
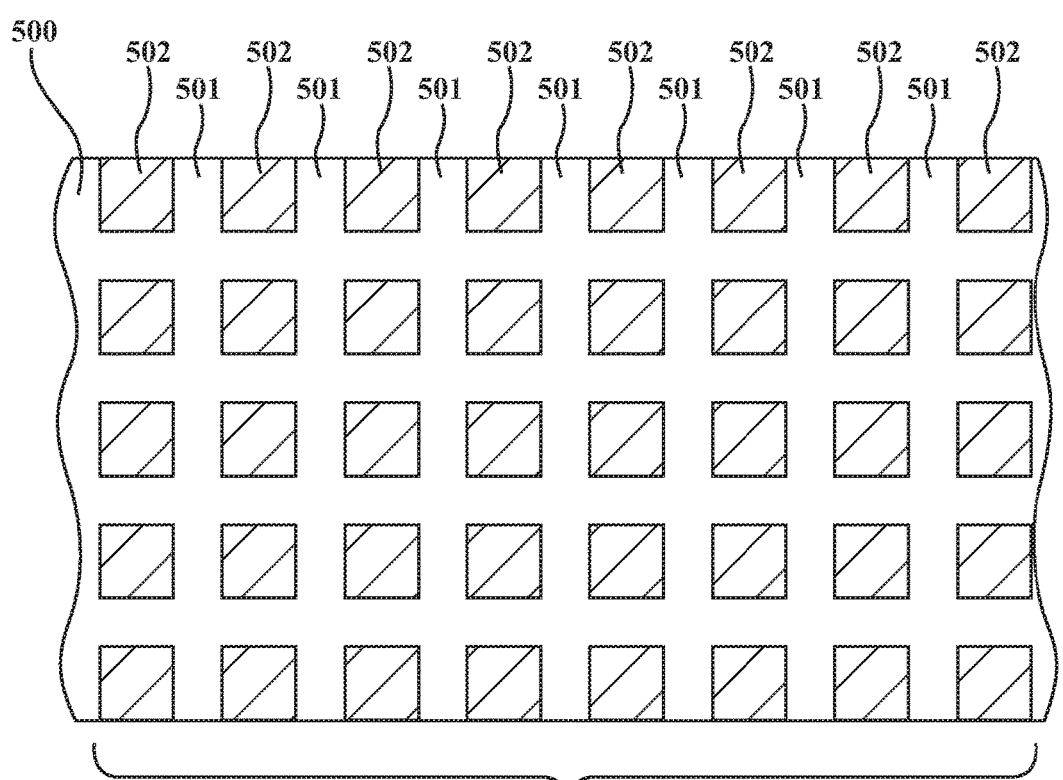
FIG. 11 schematically illustrates a localized surface hardening pattern, embodied as an additional discontinuous pattern, that may be utilized to improve wear resistance within a bearing cavity, in accordance with the present disclosure.

FIG. 11 schematically illustrates a localized surface hardening pattern 504, embodied as an additional discontinuous pattern, that may be utilized to improve wear resistance within a bearing cavity. A bearing outer race wall 500 is illustrated in a linear plan view, with a curved inner diameter of the bearing outer race wall 500 illustrated as a flattened partial span, showing the surface hardened portions 502 spaced along the bearing outer race wall 500, with the portions 501 of the material of the bearing outer race wall 500 illustrated separating the surface hardened portions 502. The surface hardened portions 502 are illustrated including a pattern of unconnected rectangular sections. In an alternative embodiment, a crossing array pattern including line segments formed at intersecting angles with each other may be utilized. Other patterns of discontinuous surface hardened portions are envisioned, thus the disclosure is not intended to be limited to the examples provided herein.

Surface hardening patterns may run perpendicular to a direction of wear. For example, in FIG. 1, one may see an axle turning within a ball bearing device disposed within either the first bearing cavity 22 or the second bearing cavity 32. As the axle turns, it may apply cyclical torque or pressure upon the ball bearing device, which in turn applies torque and/or pressure upon the respective bearing outer race wall. The direction of wear is tangential to points on the outer race wall or in the direction of spinning, about the circumference of the bearing outer race wall. As is illustrated in FIG. 4, the surface hardening pattern 64 includes the surface hardened portions 62 extending in an axial direction of the bearing cavity 22 and in an axial direction of a corresponding ball bearing device.

Figure 13:
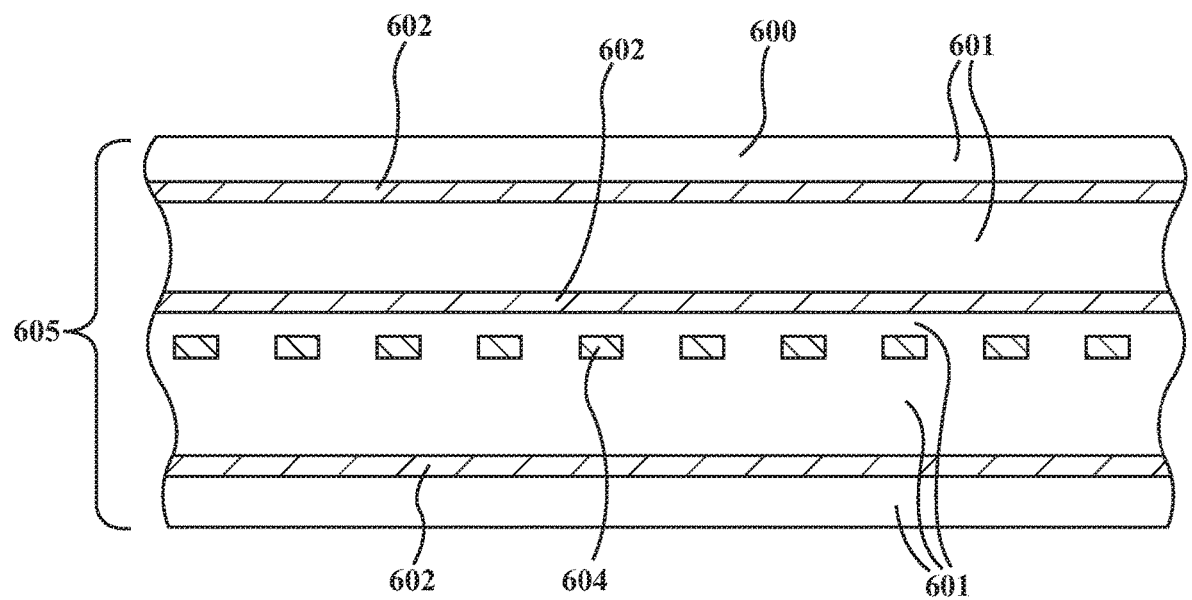
FIG. 13 schematically illustrates a localized surface hardening pattern, embodied as a surface hardening pattern extending parallel to a direction of wear, that may be utilized to improve wear resistance within a bearing cavity, in accordance with the present disclosure.

FIG. 13 schematically illustrates a localized surface hardening pattern 605, embodied as a surface hardening pattern extending parallel to a direction of wear, that may be utilized to improve wear resistance within a bearing cavity. A bearing outer race wall 600 is illustrated in a linear plan view, with a curved inner diameter of the bearing outer race wall 600 illustrated as a flattened partial span, showing the continuous, annular surface hardened portions 602 spaced along the bearing outer race wall 600, with the portions 601 of the material of the bearing outer race wall 600 illustrated separating the annular surface hardened portions 602. Additionally, a discontinuous surface hardened portion 604 is illustrated.

Referring again to FIG. 1, a localized patterned surface hardening being used to improve a metallic structure with light-weight material such as aluminum or magnesium within exemplary bearing details such as the bearing outer race wall 24 and the bearing outer race wall 34. However, the localized patterned surface hardening disclosed herein is not limited to interactions between ball bearing devices and metallic cavities. Localized patterned surface hardening may similarly be utilized in a high wear area of a metallic structure constructed similarly with light-weight materials. For example, suspension components such as upper and lower ball joints may include two metallic parts connected together with a joint wherein the parts rotate relative to each other. If one of the parts is constructed of a light-weight material, the joint may experience high wear. Localized patterned surface hardening may be utilized at the point of contact between the two parts to increase the lifespan of the light-weight material.

As described herein, a processing method to create surface hardening may include laser processing. In other embodiments, surface hardening may be created through friction-stir welding, high strain rate solid deformation, or other similar methods utilized in the art.

While the best modes for carrying out the disclosure have been described in detail, those familiar with the art to which this disclosure relates will recognize various alternative designs and embodiments for practicing the disclosure within the scope of the appended claims.

What is claimed is:

1. An apparatus for localized patterned surface hardening for light-weight alloys to increase wear resistance under lubricated contact, the apparatus comprising:
   a first metallic structure;
   a second metallic structure including a contact surface and disposed in lubricated contact with the first metallic structure at the contact surface;

wherein the second metallic structure is constructed with a lighter-than-steel material and the contact surface includes a localized surface hardened pattern;

wherein at least one of the first metallic structure and the second metallic structure defines a plurality of cavities therein; and an oil lubricant disposed in continuous contact with the first metallic structure and the second metallic structure at the contact surface and disposed within the plurality of cavities.

2. The apparatus of claim 1, wherein the localized surface hardened pattern includes a series of surface hardened portions, each surface hardened portion being separated from a remainder of the surface hardened portions by portions of the second metallic structure.

3. The apparatus of claim 2, wherein each of the surface hardened portions includes parallel boundaries.

4. The apparatus of claim 2, wherein each of the surface hardened portions is constructed of an alloy including the lighter-than-steel material and an added material.

5. The apparatus of claim 4, wherein the added material includes nickel, boron, chromium, silicone, or carbon.

6. The apparatus of claim 5, wherein the added material is provided as a high entropy alloy phase.

7. The apparatus of claim 6, wherein the high entropy alloy phase is micro-alloyed with boron, carbon, or silicone.

8. The apparatus of claim 2, wherein each of the surface hardened portions includes intermetallic particles.

9. The apparatus of claim 2, wherein each of the surface hardened portions includes a ceramic material, and wherein each of the surface hardened portions is a metallic matrix composite.

10. The apparatus of claim 1, wherein the localized surface hardened pattern includes a discontinuous parallel pattern, a discontinuous non-parallel pattern, a regularly curved pattern, or an irregularly curved pattern.

11. The apparatus of claim 1, wherein the lighter-than-steel material includes aluminum.

12. The apparatus of claim 1, wherein the lighter-than-steel material includes magnesium.

13. The apparatus of claim 1, wherein the second metallic structure is disposed in lubricated contact with the first metallic structure at the contact surface.

14. The apparatus of claim 1, wherein the localized surface hardened pattern includes an annular surface hardened portion parallel with a direction of wear for the contact surface.

15. An apparatus for localized patterned surface hardening for light-weight alloys to increase wear resistance under lubricated contact, the apparatus comprising:

a first metallic structure including a steel ball bearing device;

a second metallic structure including a transmission case housing and a contact surface, the second metallic structure being disposed in lubricated contact with the first metallic structure at the contact surface, wherein the second metallic structure is constructed with a lighter-than-steel material and the contact surface includes a localized surface hardened pattern;

wherein at least one of the first metallic structure and the second metallic structure defines a plurality of cavities therein;

an oil lubricant disposed in continuous contact with the first metallic structure and the second metallic structure at the contact surface and disposed within the plurality of cavities; and a transmission shaft inserted within the steel ball bearing device;

wherein the transmission case housing is constructed of aluminum or magnesium.

16. The apparatus of claim 15, wherein the localized surface hardened pattern includes a series of surface hardened portions, each surface hardened portion being separated from a remainder of the surface hardened portions by portions of the second metallic structure.

* * * * *